United States Patent
Kim

(10) Patent No.: US 9,413,443 B2
(45) Date of Patent: Aug. 9, 2016

(54) ELECTRONIC DEVICE INCLUDING ANTENNA AND METHOD OF CONTROLLING THE SAME

(71) Applicant: Samsung Electronics Co., Ltd., Gyeonggi-do (KR)

(72) Inventor: Jin Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 78 days.

(21) Appl. No.: 14/308,016

(22) Filed: Jun. 18, 2014

(65) Prior Publication Data

US 2015/0003551 A1    Jan. 1, 2015

(30) Foreign Application Priority Data

Jun. 26, 2013 (KR) .................... 10-2013-0073713

(51) Int. Cl.
*H04B 7/04* (2006.01)
*H04B 7/06* (2006.01)
*H04B 7/08* (2006.01)

(52) U.S. Cl.
CPC ............ *H04B 7/0602* (2013.01); *H04B 7/0691* (2013.01); *H04B 7/0693* (2013.01); *H04B 7/0802* (2013.01); *H04B 7/0874* (2013.01); *H04B 7/0877* (2013.01)

(58) Field of Classification Search
USPC ............. 455/63.1, 63.4, 67.11, 575.7, 226.1, 455/272, 273, 277.1, 277.2, 278.1
See application file for complete search history.

(56) References Cited

U.S. PATENT DOCUMENTS

| | | | | |
|---|---|---|---|---|
| 7,627,296 B2* | 12/2009 | Kezys | ................... | H01Q 1/243 455/140 |
| 8,781,420 B2* | 7/2014 | Schlub | ................... | H01Q 1/243 455/115.1 |
| 8,872,706 B2* | 10/2014 | Caballero | ............. | H01Q 1/243 343/702 |
| 2012/0142291 A1* | 6/2012 | Rath | ................... | H04B 7/0602 455/127.1 |
| 2012/0142396 A1 | 6/2012 | Choi | | |
| 2013/0156080 A1* | 6/2013 | Cheng | ................... | H01Q 1/243 375/222 |

FOREIGN PATENT DOCUMENTS

KR    10-2012-0062122    6/2012

* cited by examiner

*Primary Examiner* — Blane J Jackson
(74) *Attorney, Agent, or Firm* — Cha & Reiter, LLC.

(57) ABSTRACT

An apparatus includes a diversity antenna, an additional antenna, and at least one processor. The diversity antenna is configured to provide data communication according to a first communication scheme. The additional antenna is configured to provide data communication according to one of the first communication scheme and a second communication scheme different from the first communication scheme. The at least one processor is configured to: detect a condition affecting performance of the diversity antenna, and determine, in response to detection of the condition, whether to switch from utilization of the diversity antenna to utilization of the additional antenna.

17 Claims, 10 Drawing Sheets

ELECTRONIC DEVICE INCLUDING ANTENNA AND METHOD OF CONTROLLING THE SAME

CROSS-REFERENCE TO RELATED APPLICATION

This application claims priority from and the benefit of Korean Patent Application No. 10-2013-0073713, filed on Jun. 26, 2013, which is incorporated by reference for all purposes as if set forth herein.

BACKGROUND

1. Field

Exemplary embodiments relate to electronic devices including antennas and methods of controlling the same, and, more particularly, to electronic devices configured to switch between a plurality of antennas and methods of controlling the same.

2. Discussion

The ubiquitous demand for electronic devices, such as smart phones, tablet personal computers (PCs), and the like, is unquestionable. Generally speaking, these electronic devices typically include a mobile communication module to enable one or more call functions and at least one sub-communication module. For example, an electronic device may initiate a communication session with another device using the mobile communication module and/or may perform sub-communication with the other or yet another device using the sub-communication module. It is noted that at least some of these communications may be performed based on transmitting and/or receiving data to/from an access point (AP) using, for instance, a second generation (2G), third generation (3G), Long Term Evolution (LTE), etc., infrastructure.

Conventional smart phones, tablet PCs, and other like devices, typically use a diversity communication scheme when transmitting/receiving data to/from APs. For example, a diversity antenna may be utilized to perform the communications using the communication module and the sub-communication module. It is also noted that diversity antennas may be utilized to mitigate issues associated with fading, such as temporal fading, spatial fading, frequency-based fading, and the like. In this manner, however, these conventional electronic devices that include a main system and a diversity system will typically not employ the diversity communication scheme when the efficiency of the diversity antenna deteriorates. That is, communication will typically be performed using a main antenna (and, thereby, not the diversity antenna) when cell power, received signal code power (RSCP) feedback from a diversity system, etc., is smaller than or equal to a reference value. It is noted, however, that by using the main antenna (and, thereby, not the diversity antenna), transmission rates may be reduced.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an apparatus and a control method thereof to exchange an antenna for a diversity antenna and use the exchanged antenna when a capability of a diversity system deteriorates.

Additional aspects will be set forth in the detailed description which follows and, in part, will be apparent from the disclosure, or may be learned by practice of the inventive concept.

According to exemplary embodiments, a method includes: performing data communication using a diversity antenna; detecting a condition affecting performance of the diversity antenna; switching, in response to detecting the condition, from the diversity antenna to the additional antenna; and continuing performance of the data communication using the additional antenna.

According to exemplary embodiments, an apparatus includes a diversity antenna, an additional antenna, and at least one processor. The diversity antenna is configured to provide data communication according to a first communication scheme. The additional antenna is configured to performs data communication according to one of the first communication scheme and a second communication scheme different from the first communication scheme. The at least one processor is configured to: detect a condition affecting performance of the diversity antenna, and determine, in response to detection of the condition, whether to switch from utilization of the diversity antenna to utilization of the additional antenna.

According to exemplary embodiments, an electronic device and a control method thereof may exchange an antenna for a diversity antenna and use the exchanged antenna when a capability of a diversity system deteriorates. In this manner, even though the capability of the diversity system deteriorates, the diversity system can be continuously used by exchanging the diversity antenna for a different antenna. As such, even though the capability of the diversity system deteriorates, the diversity system and the main system can simultaneously operate to increase the data transmission rate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept and are incorporated in and constitute a part of this specification, illustrate exemplary embodiments of the inventive concept, and together with the description serve to explain principles of the inventive concept.

DETAILED DESCRIPTION OF THE ILLUSTRATED EMBODIMENTS

Figure 1:
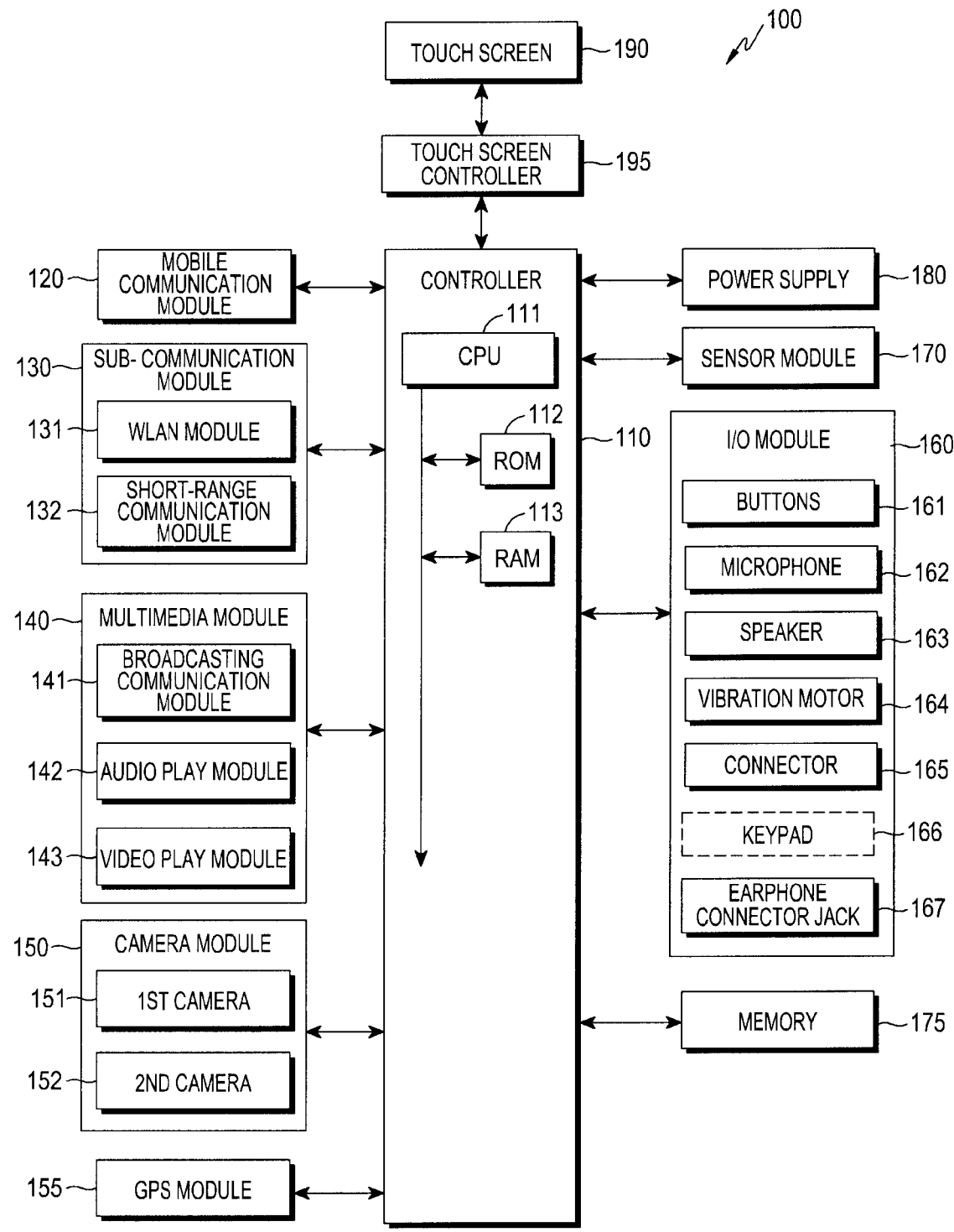
FIG. 1 is a block diagram of an electronic device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments described herein are explained in association with one or more devices that may include one or more modules. As used herein, the term "module" may be understood to refer to software, firmware, hardware, and/or various combinations thereof. It is noted that the modules are merely exemplary. The modules may be combined, integrated, separated, and/or duplicated to support various applications and/or processes, such as one or more of the processes described herein. To this end, a function described as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device and/or may be included in both devices.

FIG. 1 is a block diagram of an electronic device, according to exemplary embodiments.

Referring to FIG. 1, the electronic device 100 may be connected to an external device (not shown) using an external device connector, such as via a sub-communication module 130, a connector 165, an earphone connector jack 167, etc. The "external device" may be attached to and/or detached from the electronic device 100 via any suitable wireline medium, such as external devices like earphones, external speakers, universal serial bus (USB) memories, chargers, cradles/docks, digital multimedia broadcasting (DMB) antennas, mobile payment related devices, health management devices (e.g., a blood sugar tester, etc.), game machines, navigational devices, and the like. Further, the "external device" may include, for example, a Bluetooth™ communication device, a short-range communication device (e.g., a near field communication (NFC) device, a WiFi (IEEE 802.11) direct communication device, a wireless access point (AP), etc.), and the like, which may be wirelessly connected to the electronic device 100 via any suitable wireless communication medium. To this end, the external device may include another electronic device, such as, for example, a mobile phone, a smart phone, a tablet personal computer (PC), a desktop PC, a server, etc.

According to exemplary embodiments, the electronic device 100 may be, for instance, any suitable mobile electronic device 100. In this manner, the electronic device 100 may be or otherwise include a tablet PC, a desktop PC, a smart television (TV), a notebook computer, a music player, etc.

As seen in FIG. 1, the electronic device 100 may include a touch screen 190 and a touch screen controller 195. Further, the electronic device 100 may include a controller 110, a mobile communication module 120, a sub-communication module 130, a multimedia module 140, a camera module 150, a global positioning system (GPS) module 155, an input/output (IO) module 160, a sensor module 170, a storage unit (or memory) 175, and a power supply 180. Although specific reference will be made to this particular implementation, it is also contemplated that the electronic device 100 may embody many forms and include multiple and/or alternative components. For example, it is contemplated that the components of electronic device 100 may be combined, located in separate structures, etc.

According to exemplary embodiments, the sub-communication module 130 may include at least one of a wireless local area network (WLAN) module 131 and a short-range communication module 132. The multimedia module 140 may include at least one of a broadcasting communication module 141, an audio reproduction (or audio play) module 142, and a video reproduction (or video play) module 143. The camera module 150 may include at least one of a first camera 151 and a second camera 152. The input/output module 160 may include at least one of one or more buttons 161, a microphone 162, a speaker (or other transducer) 163, a vibration motor 164, a connector 165, a keypad 166, and an earphone connector jack 167.

In exemplary embodiments, the controller 110 may include a central processing unit (CPU) 111, a read-only memory (ROM) 112 to store at least one control program to control the electronic device 100, and a random access memory (RAM) 113, which may be used as a storage area to store, for instance, a signal or data input from a source outside of (or otherwise external to) the electronic device 100 and/or any other suitable data to perform one or more of the exemplary embodiments described herein. The CPU 111 may include a single core, a dual core, a triple core, a quadruple core, or any other suitable single or multicore architecture. The CPU 111, the ROM 112, and the RAM 113 may be mutually connected to each other through, for instance, an internal bus. To this end, the controller 110 may be configured to control the mobile communication module 120, the sub-communication module 130, the multimedia module 140, the camera module 150, the GPS module 155, the input/output module 160, the sensor module 170, the storage unit 175, the power supply 180, the touch screen 190, and the touch screen controller 195.

The mobile communication module 120 may be configured to enable the electronic device 100 to be connected to an external device via mobile (or otherwise wireless) communication using one or more antennas based on one or more commands, instructions, signals, etc. received from the controller 110. The mobile communication module 120 may be configured to transmit and receive wireless signals associated with voice communications, video communications, messaging communications (e.g., short message service (SMS) communications, multimedia message service (MMS) communications, etc.) to and from another electronic device, such as a mobile phone (not shown), a smart phone (not shown), a tablet PC, or any other suitable device (not shown), which may be associated with a phone number (or other contact information) that may be input and/or stored in the electronic device 100.

The sub-communication module 130 may include at least one of the WLAN module 131 and the short-range communication module 132. For example, the sub-communication module 130 may include the WLAN module 131, the short-range communication module 132, or both the WLAN module 131 and the short-range communication module 132.

In exemplary embodiments, the WLAN module 131 may be configured to connect to at least one communication network, such as the Internet, based on the exchange of data with, for example, a wireless AP (not shown). It is noted that the controller 110 may control the exchange of data between the WLAN module 131 and the wireless AP. The WLAN module 131 may support one or more WLAN standards, such as, for example, one or more of the IEEE 802.11 standards of the Institute of Electrical and Electronics Engineers. The short-range communication module 132 may wirelessly perform short-range communications between the electronic device 100 and, for instance, an image forming apparatus (not shown) based on one or more commands of the controller 110. For example, the short-range communications may employ Bluetooth™, infrared data association (IrDA) communications, WiFi-direct communications, near field communication (NFC), and/or the like.

The electronic device 100 may include at least one of the mobile communication module 120, the WLAN module 131, and the short-range communication module 132. For example, the electronic device 100 may include a combination of the mobile communication module 120, the WLAN module 131, and the short-range communication module 132.

The multimedia module 140 may include the broadcasting communication module 141, the audio reproduction module 142, and/or the video reproduction module 143. The broadcasting communication module 141 may receive a broadcasting signal (for example, a TV broadcasting signal, a radio broadcasting signal, and/or a data broadcasting signal) and/or broadcasting supplemental information (for example, electronic program guide (EPG) or electronic service guide (ESG) information) output from, for instance, a broadcasting station through a broadcasting communication antenna (not shown). The broadcasting communication module 141 may be controlled by the controller 110. The audio reproduction module 142 may reproduce a digital audio file (for example, a file having a file extension of aac, atrac, mp3, wma, ogg, wav, etc.) stored or received based on one or more commands from, for instance, the controller 110. The video reproduction module 143 may reproduce a digital video file (for example, a file having a file extension of avchd, divX, mpeg, mpg, mp4, mpo, avi, mov, mkv, mjpeg, wmv, etc.) stored or received based on one or more commands received from, for example, the controller 110. It is also contemplated that the video reproduction module 143 may be utilized to reproduce the digital audio file.

In exemplary embodiments, the multimedia module 140 may include the audio reproduction module 142 or the video reproduction module 143, and, thereby, may not include the broadcasting communication module 141. It is also contemplated that one or more of the audio reproduction module 142 and the video reproduction module 143 may be included as part of the controller 110.

The camera module 150 may include at least one of the first camera 151 and the second camera 152 which may facilitate photographing a still image or a video based on one or more commands received from, for instance, the controller 110. Further, the first camera 151 or the second camera 152 may include an auxiliary light source (for example, a flash (not shown)) to provide artificial light to illuminate a scene. The first camera 151 may be disposed on a front surface of the electronic device 100, and, thereby, considered a forward-facing camera, whereas the second camera 152 may be disposed on a back surface of the electronic device 100, and, thereby, considered a rear-facing camera. Alternatively, the first camera 151 and the second camera 152 may be disposed relatively close to one another on a same side of the electronic device 100 (for example, the first camera 151 and the second camera 152 may be spaced apart by, for instance, at least 1 cm, but less than 8 cm), and, thereby, utilized to photograph a three dimensional still image or a three dimensional video. In this manner, the first camera 151 and the second camera 152 may be utilized to capture stereoscopic information.

The GPS module 155 may receive radio waves (or other form of electromagnetic radiation) from a plurality of GPS satellites (not shown) in Earth's orbit, and, thereby, configured to calculate a position of the electronic device 100 based on time of arrival information of the radio waves received from the GPS satellites. It is contemplated, however, that electronic device 100 may determine positional (or spatial) information using any additional or alternative suitable location determination technology, such as, for example, via advanced forward link trilateration (AFLT), assisted-GPS (A-GPS), cell-identification (CELL-ID), observed time difference of arrival (OTDOA), enhanced-observed time difference (E-OTD), etc. In this manner, GPS module 155 may be generally considered a location determination module 155.

According to exemplary embodiments, the input/output module 160 may include at least one of the button 161(s), the microphone 162, the speaker 163, the vibration motor 164, the connector 165, the keypad 166, and the earphone jack 167.

The button(s) 161 may be disposed on the front surface 100a, a side surface 100b, or a back surface (not shown) of the electronic device 100. In this manner, the button(s) 162 may include at least one of a power/reset button 161d, a volume button (not illustrated), a menu button 161d, a home button 161a, a back button 161c, and a search button (now shown).

The microphone 162 may be configured to receive a voice or other sound, and, thereby, may generate an electrical signal according to a control of the controller 110. The speaker 163 may output sounds corresponding to various signals (for example, a wireless signal, a broadcasting signal, an audio file, a video file, etc.), which may be associated with one or more of the mobile communication module 120, the sub-communication module 130, the multimedia module 140, the camera module 150, the input/output module 160, etc. In this manner, the speaker 163 may output the sound(s) to the outside of the electronic device 100 based on one or more commands received from, for example, the controller 110. The speaker 163 may output a sound (for example, a button tone corresponding to phone communication, a ring tone, a voice of called or calling party, etc.) corresponding to a function performed by the electronic device 100. It is contemplated that the electronic device 100 may include one speaker 163 or a plurality of speakers 163. The speaker(s) 163 may be disposed in any suitable position or positions of the housing of the electronic device 100.

The vibration motor 164 may convert an electrical signal to a mechanical vibration according to a control of the controller 110. For example, when the electronic device 100 is configured in a vibration mode and receives voice or video phone communication from another device (not shown), a vibration motor 164 may be operated. It is noted that the electronic device 100 may include one or more vibration motors 164 within the housing of the electronic device 100. The vibration motor 164 may also be configured to operate in accordance with a touch (or other interactive) action of a user on (or in association with) the touch screen or successive motions of the touch on the touch screen 190. In this manner, the vibration motor 164 may be utilized to provide tactile feedback to the user of the electronic device 100.

The connector 165 may be used as an interface for connecting the electronic device 100 with an external device (not shown) or a power source (not shown). The electronic device 100 may transmit or receive data stored in the storage unit 175 of the electronic device 100 to or from an external device (not shown) through a wired cable connected to the connector 165 according to a control of the controller 110. The external device may be a docking station, and the data may be an input signal transmitted from an external input device, for example, a mouse, a keyboard, or the like. Further, the electronic device 100 may receive power from the power source through the wired cable connected to the connector 165 or charge a battery (not shown) using power from the power source.

In exemplary embodiments, the keypad 166 may receive a key input to control of the electronic device 100. The keypad 166 may include a physical keypad (not shown) formed in a portion of the electronic device 100 or a virtual keypad (not shown), which may be displayed on the display unit 190. It is noted that the physical keypad (not shown) may be excluded based on the configuration and/or structure of the electronic device 100.

A connector associated with, for instance, an earphone (not shown), speaker (not illustrated), etc., may be inserted into the earphone connecting jack 167. In this manner, the electronic device 100 may output sound to the connected earphone, speaker, etc., in lieu of or in addition to outputting sound to speaker(s) 163.

According to exemplary embodiments, the sensor module 170 may include at least one sensor configured to detect a state of the electronic device 100. For example, the sensor module 170 may include at least one of a proximity sensor to detect whether a user (or other object) approaches the electronic device 100, an illumination sensor to detect an amount of ambient light, etc. It is also contemplated that the sensor module 170 may include a gyro sensor to detect an operation (for example, rotation, acceleration, vibration, etc.) of the electronic device 100, a cardinal/ordinal point (or direction) based on the Earth's magnetic field, detect a gravitational force and/or direction, etc. The sensor module 170 may include an altimeter to measure atmospheric pressure, and, thereby, to detect an altitude. It is contemplated, however, that any suitable sensor(s) may be utilized in association with the sensor module 170. In this manner, at least one sensor of the sensor module 170 may detect a state, generate at least one signal corresponding to the detected state, and transmit the at least one signal to the controller 110. As such, any suitable number and/or type of sensors may be added to or omitted from the electronic device 100.

The storage unit 175 may store a signal or data input/output according to the operation of the communication module 120, the sub-communication module 130, the multimedia module 140, the camera module 150, the GPS module 155, the input/output module 160, the sensor module 170, the touch screen 190, the controller 110, etc. The storage unit 175 may store a control program and applications to control the electronic device 100 or the controller 110. It is noted that the term "storage unit" includes the storage unit 175, the ROM 112 and the RAM 113 of the controller 110, or a memory card (not shown) (for example, a secure digital (SD) card, memory stick, etc.) installed in (or otherwise coupled to) the electronic device 100. The storage unit 175 may include a non-volatile memory, a volatile memory, a hard disk drive (HDD), a solid state drive (SSD), or any other suitable non-transitory medium.

In exemplary embodiments, the power supply 180 may be configured to supply power to one or more batteries (not shown) associated with the electronic device 100 based on one or more commands received from, for example, the controller 110. In this manner, the one or more batteries may supply power to the electronic device 100. Further, the power supply 180 may supply power input from an external power source (not shown) to the electronic device 100 via a wired cable connected to the connector 165. In addition, the power supply 180 may supply power wirelessly input from the external power source to the electronic device 100 through a wireless charging medium, such as an electromagnetic field.

The touch screen 190 may include any suitable form of touch screen device. In this manner, the touch screen 190 may provide one or more user interfaces (e.g., graphical user interfaces) corresponding to various services (for example, call, data transmission, broadcasting, messaging, photography, scheduling, navigation, etc., services/functions) to users of the electronic device 100. The touch screen 190 may transmit a signal corresponding to at least one touch input to the touch screen controller 195. In this manner, the touch input may correspond to an interaction with a body part (for example, a finger, thumb, hand, etc.) or a touchable input apparatus (for example, a stylus pen, etc.). Further, the touch screen 190 may receive successive or patterned motions/gestures associated with one or more touches of the touch screen 190. In this manner, the touch screen 190 may transmit at least one signal corresponding to the successive or patterned motions/gestures to the touch screen controller 195. It is also contemplated that the touch screen 190 may be configured to detect non-contact events, "near" touches, hovering actions, etc. In this manner, the touch screen 190 may be implemented as, for example, a resistive-type, a capacitive-type, an electro-magnetic resonance (EMR)-type, an infrared-type, an acoustic wave-type, an optical imaging-type, a dispersive signal-type, etc., and/or a combination thereof.

According to exemplary embodiments, the touch screen controller 195 may convert a received signal (e.g., an analog signal) to another signal (e.g., a digital signal), such as, for example, X and Y coordinate signals, and transmit the converted signal to the controller 110 in association with one or more functions of the electronic device 100. The controller 110 may control the touch screen 190 using the converted signal received from the touch screen controller 195. For example, the controller 110 may allow a short-cut icon displayed on the touch screen 190 to be selected or executed in response to a touch interaction. It is also contemplated that one or more features of the touch screen controller 195 may be provided by the controller 110.

Figure 2:
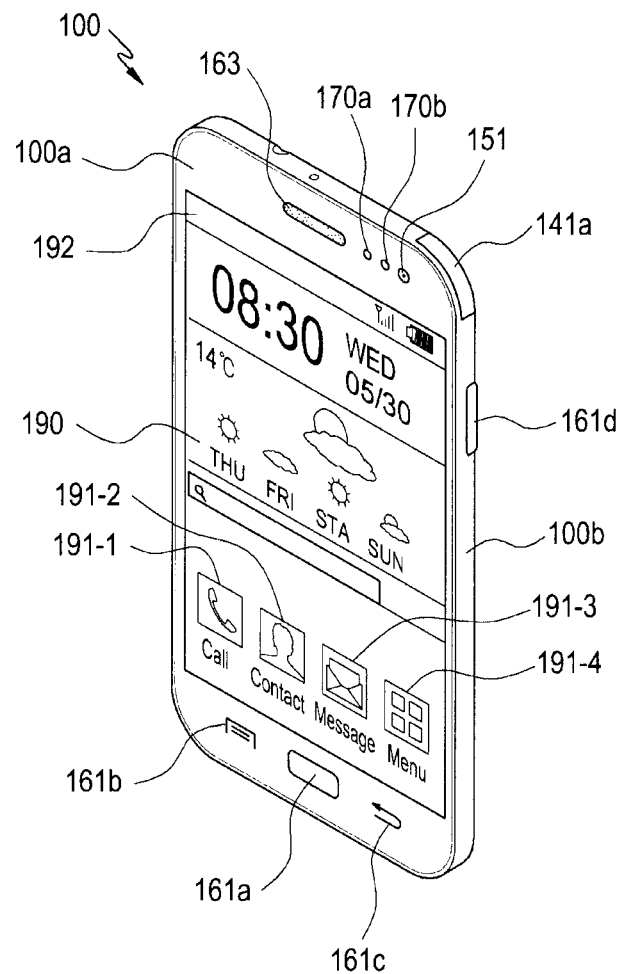
FIG. 2 is a perspective view of an illustrative electronic device, according to exemplary embodiments.

FIG. 2 is a perspective view of an illustrative electronic device, according to exemplary embodiments. In exemplary embodiments, the electronic device 110 may be implemented as a mobile device, e.g., a smart phone, as shown in FIG. 2. It is contemplated, however, that any other suitable electronic device may be utilized.

According to exemplary embodiments, the touch screen 190 may be disposed in a central area of a front surface 100a of the electronic device 100. The touch screen 190 may be relatively large, e.g., may occupy a substantial amount of the surface area of the front surface 100a. It is noted that FIG. 2 shows an example of the touch screen 190 presenting a main home screen. The main home screen may be a screen displayed on the touch screen 190 when, for instance, the electronic device 100 is turned on. Further, when the electronic device 100 includes different home screens that may be defined as one or more pages, the main home screen may be a first home screen of the one or more pages. Short-cut icons 191-1, 191-2, and 191-3 may be provided to execute (or otherwise initialize) frequently used applications, such as telephony application, a contact managing application, a messaging application, etc. An application switching key 191-4 may be provided to access one or more other menus and/or applications of the electronic device 100. To this end, the first home screen may include time and date information, weather information, and the like. The application switching key 191-4 may include images of one or more application icons accessible via the application switching key 191-4 and/or displayed on the touch screen 190. A status bar 192 may be provided to present the status of the electronic device 100, such as a battery charging status, intensity (or strength) of a received signal, etc. A current time and date may be presented at or near an upper end of the touch screen 190.

A home button 161a, a menu button 161b, and a back button 161c may be formed below the touch screen 190. The home button 161a may be configured to cause the main home screen to be displayed on the touch screen 190. For example, when the home button 161a is pressed in a state where a home screen different from the main home screen, the menu screen, or an application screen is displayed on the touch screen 190, the main home screen may be displayed on the touch screen 190. Further, when the home button 161a is pressed while applications are being executed via the touch screen 190, the main home screen illustrated in FIG. 2 may be displayed on the touch screen 190. In addition, the home button 161a may be used to display recently used applications or a task manager on the touch screen 190.

According to exemplary embodiments, the menu button 161b may provide a connection menu that may be used on the touch screen 190. The connection menu may include a widget addition menu, a background changing menu, a search menu, an editing menu, an environment setup menu, and/or the like. Further, the menu button 161b may provide a connection menu connected to an application when the application is executed. The back button 161c may be used to display a screen previously executed just before a currently executed screen or terminating a most recently used application.

In exemplary embodiments, the first camera 151, the illumination sensor 170a, and the proximity sensor 170b may be disposed in association with the front surface 100a of the electronic device 100. The second camera 152, a flash, and at least one of the speakers 163 may be disposed on a rear surface of the electronic device 100. Further, the electronic device 100 may include a power/reset button 161d, at least one volume control button (not shown), a terrestrial DMB antenna 141a for broadcast reception, and one or a plurality of microphones (not illustrated) on a side surface 100b of the electronic device 100. The DMB antenna 141a may be fixed to the electronic device 100 or may be detachable from the electronic device 100.

Although not illustrated in FIG. 2, the connector 165 may be formed in a lower side surface of the electronic device 100. A plurality of electrodes may be formed in the connector 165, and the connector 165 may be connected to an external device through a wire coupled to the connector 165. The earphone connector jack 167 may be formed on a side surface of an upper end of the electronic device 100. In this manner, an earphone or speaker jack may be inserted into the earphone connector jack 167.

Figure 3:
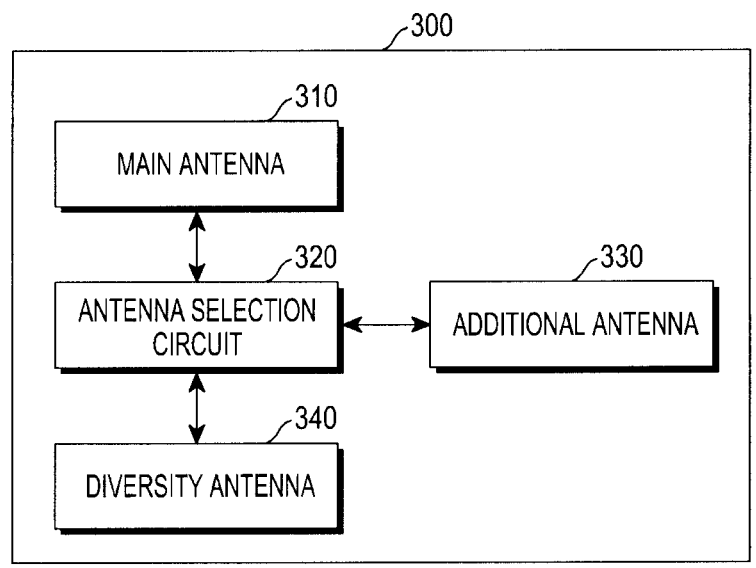
FIG. 3 is a block diagram of an antenna system, according to exemplary embodiments.

FIG. 3 is a block diagram of an antenna system, according to exemplary embodiments. Antenna system 300 may include a main antenna 310, an antenna selection circuit (or module) 320, an additional antenna 330, and a diversity antenna 340. Although specific reference will be made to this particular implementation, it is also contemplated that antenna system 300 may embody many forms and include multiple and/or alternative components.

According to exemplary embodiments, the main antenna 310 may be built, for example, in the electronic device 100, and may be a linear polarization antenna including a conductive radiator at least partially enclosed in an injection molded material or any other suitable housing. The main antenna 310 may transmit/receive data to/from an access point (AP) or any other suitable source or sink. For instance, the main antenna 310 may transmit/receive data to/from the AP using, for example, one or more first frequencies. It is noted that the one or more first frequencies may be in a range of first frequencies.

The antenna selection circuit 320 may control at least one connection state of the additional antenna 330 and the diversity antenna 340. For example, the antenna selection circuit 320 may disconnect a connection to the diversity antenna 340 when a capability of a diversity system deteriorates. To this end, the antenna selection circuit 320 may disconnect the connection to the diversity antenna 340 and connect the additional antenna 330 with the diversity system when the capability of the diversity system deteriorates. The operation of the antenna selection circuit 320 will be described below in more detail.

The additional antenna 330 may be an antenna configured to facilitate various communication modules, and, thereby, modes of communication. For example, the electronic device 100 may include various communication modules, such as a WiFi communication module, a Bluetooth communication module, a Bluetooth Low Energy (BLE) communication module, a ZigBee communication module, etc. Further, each of the additional communication modules may include an additional antenna.

The diversity antenna 340 may be used with the main antenna 310 for preventing fading (e.g., temporal fading, spatial fading, frequency-based fading, etc.), The diversity antenna 340 may be implemented by, for example, a loop antenna, an inverted F-antenna (IFA), a wire antenna, a meander antenna, or any other suitable antenna. In exemplary embodiments, the diversity antenna 340 may be a multiple input and multiple output (MIMO) antenna, and, thereby, may include a plurality of antennas at both a transmitter portion and a receiver portion of an electronic device to improve communication performance. The diversity antenna 340 may use various diversity schemes to improve quality and reliability of a wireless link, such as, for example, polarization diversity, space (or spatial) diversity, time (or temporal) diversity, and frequency diversity. In this manner, the diversity antenna 340 may operate in conjunction with the main antenna 310, and, thereby, configured to use one or more second frequencies. It is noted that the one or more second frequencies may be in a range of second frequencies or may be various frequencies of the one or more first frequencies. To this end, the one or more second frequencies may be the same as or different from the one or more first frequencies. In this manner, an optimal (or otherwise improved) signal may be output through a combination of signals transmitted/received by the main antenna 310 and the diversity antenna 340 to prevent fading.

According to exemplary embodiments, the additional antenna 330 may use one or more third frequencies; however, the additional antenna 330 may be designed to use the one or more second frequencies, as well as the one or more third frequencies. It is noted that the one or more third frequencies may be in a range of third frequencies and may be different from the one or more first and second frequencies. For example, the additional antenna 330 may operate based on a communication protocol stack of an additional communication module (not shown), which is different from the mobile communication module 120 and the sub-communication module 130. Further, the additional antenna 330 may be designed to operate based on a communication protocol stack used for the main antenna 310, e.g., operate according to one or more of the first frequencies.

In exemplary embodiments, the diversity antenna 340 may perform, for instance, data communication with an AP based on various communication schemes, such as wideband code division multiple access (WCDMA), global system for communications (GSM), high speed packet access (HSPA), evolved universal terrestrial radio access (E-UTRA), and evolved universal terrestrial radio access network (E-UTRAN), and the like. To this end, the main antenna 310 and/or the diversity antenna 340 may operate in, for example, one or more of the 90 MHz, 1800 MHz, 2100 MHz, and 2400 MHz frequency ranges.

The additional antenna 330 may perform communication based on, for example, WiFi (IEEE 802.11). In this manner, the additional antenna 330 may operate in a 2.4 GHz or 5 GHz frequency range corresponding to a frequency of WiFi communications, and, thereby, configured to operate based on at least one WiFi communication protocol stack. The additional antenna 330, according to exemplary embodiments, may be designed to operate additionally in one or more of the 900 MHz, 1800 MHz, 2100 MHz, and 2400 MHz frequency ranges, as well as in the 2.4 GHz or 5 GHz frequency ranges. Further, the additional antenna 330 may be designed to perform, for instance, data communications with an AP additionally based on various communication schemes, such as WCDMA, GSM, HSPA, E-UTRA, and E-UTRAN, as well as based on the WiFi communication protocol stack.

Although described in association with the aforementioned communication protocols and associated frequency ranges, the additional antenna 330 may be additionally or alternatively implemented to operate in association with any other suitable communication protocol and associated one or more frequency ranges. In this manner, the additional antenna 330 may operate according to the Bluetooth standard, the BLE standard, the ZigBee (IEEE 802.15.4) standard, as well as the WiFi communication scheme.

Figure 4:
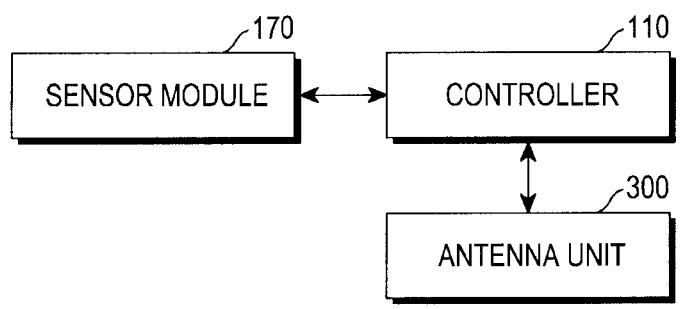
FIG. 4 is a block diagram of an electronic device, according to exemplary embodiments.

FIG. 4 is a block diagram of an electronic device, according to exemplary embodiments. As illustrated in FIG. 4, the electronic device 100 may include the controller 110, the sensor module 170, and an antenna unit 300 described in association with FIGS. 1 and 3.

According to exemplary embodiments, the sensor module 170 may sense whether a part of a user's body contacts the electronic device 100. The sensor module 170 may include, for example, an optical sensor at a position of the housing of the electronic device 100. It is contemplated, however, that any other suitable presence-based sensor may be utilized. In exemplary embodiments, the user may cover a part of the housing where the optical sensor is located by, for example, their hand. As such, the sensor module 170 may sense a drop in luminance incident to the optical sensor, and, thereby, configured to determine that the user is holding the electronic device 100. The optical sensor, therefore, may be disposed where a user generally holds the electronic device 100. It is noted, however, that one or more optical sensors may be utilized to capture information associated with an assortment of housing positions. In this manner, based on different grips of the electronic device 100, the sensor module 170 may still be able to suitably determine the presence of the user, e.g., the "holding" action.

Additionally or alternatively, the sensor module 170 may include a capacitive touch sensor at one or more housing positions. In this manner, the user may cover a part of the housing of the electronic device 100 where the capacitive touch sensor is located by holding the electronic device 100. The sensor module 170 may sense a change in capacitance by the "holding" action of the user. As such, the capacitive touch sensor may be disposed where a user generally holds the electronic device 100. It is noted, however, that one or more capacitive sensors may be utilized to capture information associated with an assortment of housing positions. In this manner, based on different grips of the electronic device 100, the sensor module 170 may still be able to suitably determine the presence of the user, e.g., the "holding" action. To this end, by combining at least one optical sensor and at least one capacitive sensor, the sensor module 170 may be configured to better ensure the sensed information corresponds to a "holding" action of a user, and, thereby, does not correspond to a false positive situation.

Additionally or alternatively, the sensor module 170 may include a pressure sensor at one or more housing positions. In this manner, a user may cover a part where the pressure sensor is located by holding the electronic device 100. The sensor module 170 may sense a change in pressure by the "holding" action of the user. As such, the pressure sensor may be disposed where a user generally holds the electronic device 100. It is noted, however, that one or more pressure sensors may be utilized to capture information associated with an assortment of housing positions. In this manner, based on different grips of the electronic device 100, the sensor module 170 may still be able to suitably determine the presence of the user, e.g., the "holding" action. To this end, by combining at least one optical sensor, at least one capacitive sensor, and/or at least one pressure sensor, the sensor module 170 may be configured to better ensure the sensed information corresponds to a "holding" action of a user, and, thereby, does not correspond to a false positive situation.

As described above, at least one optical sensor, capacitive touch sensor, and/or pressure sensor may be utilized in association with the sensor module 170 to determine whether a user's body touches (e.g., is holding) the electronic device 100. It is noted, however, that a grip sensor or a capacitive grip sensor may be additionally or alternatively utilized to determine whether the user's body touches (e.g., is gripping) the electronic device 100.

In exemplary embodiments, when it is determined that a part of the user's body touches the electronic device 100, the controller 110 may control the electronic device 100 to disconnect a connection between the diversity system and the diversity antenna 340 and connect the diversity system with the additional antenna 330. It is noted, however, that controlling the connections of the various antennas of antenna system 300 based on contact between the electronic device 100 and a user is just one illustrative example. That is, the detection and/or determination of any other suitable situation may be utilized to trigger one or more connection states between the main antenna 310, the additional antenna 330, and the diversity antenna 340 of the antenna system 300. For example, one or more connections of the antennas 310, 330, and 340 may be controlled under a condition preset for a reduction in intensity of a received signal, which will be described below in more detail.

According to exemplary embodiments, the additional antenna 330 may operate in one or more frequency ranges used by the diversity antenna 340 and may be designed to operate based on one or more communication protocol stacks used in association with the diversity system. It is noted that a capability of the diversity antenna 340 may deteriorate by, for instance, contact between a user and the electronic device 100, such as contact between the user and the diversity antenna 340. In this manner, the controller 110 may change at least one connection state between the diversity system and the diversity antenna 340, such as control the electronic device 100 to enable a connection between the diversity system and the additional antenna 330 when the capability of the diversity antenna 340 deteriorates below a threshold level. As such, the additional antenna 330 can perform, for example, the data communication of the diversity system so that a communication speed does not deteriorate.

Figure 5:
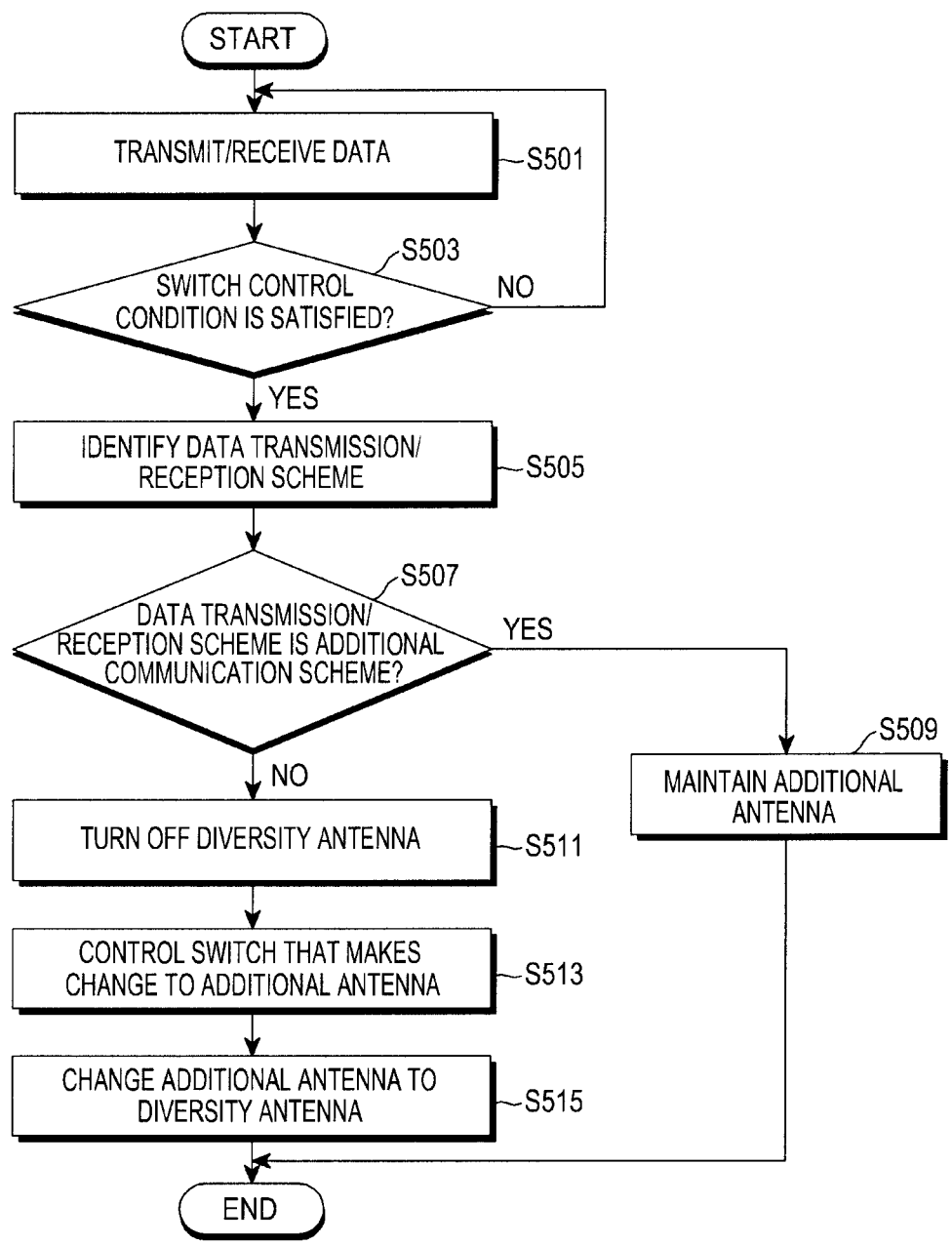
FIG. 5 is a flowchart of a process to control an electronic device, according to exemplary embodiments.

FIG. 5 is a flowchart of a process to control an electronic device, according to exemplary embodiments. This exemplary process is provided by way of example, as there are a variety of ways to carry out methods disclosed herein. The method shown in FIG. 5 may be executed or otherwise performed by one or a combination of various systems, modules, and/or devices. The method is described below as carried out by the electronic device 100 of FIGS. 1-4, and various elements thereof are referenced in explaining the process of FIG. 5. In this manner, each block shown in FIG. 5 may represent one or more processes, methods, or subroutines executed in association with carrying out the process. In hits manner, one or more of the processes, methods, or subroutines may be combined, separated, and/or rearranged without departing from exemplary embodiments described herein.

The electronic device 100 may transmit/receive data in S501. The electronic device 100 may determine whether a switch control condition is satisfied in S503. The switch control condition refers to a condition under which the diversity antenna 340 deteriorates, for example, a condition associated with a contact between the electronic device 100 and a part of the body thereof, a contact between the electronic device 100 and a metal material, and a reduction in intensity of a received signal of the electronic device 100. If a switch control condition is not satisfied, such as in S503—NO, the electronic device 100 may continue to transmit/receive data in S5501.

In response, however, to determining that the switch control condition is satisfied in S503—YES, the electronic device 100 may identify a data transmission/reception scheme in S505. At step S507, it is determined whether the data transmission/reception scheme is an additional communication scheme.

In response to determining that the data transmission/reception scheme is performed based on an additional communication scheme used by the additional antenna 330 in S507—YES, an operation of the additional antenna 330 may be maintained in S509. For example, the additional antenna 330 of the electronic device 100 may be a WiFi antenna. The electronic device 100 may sense (or otherwise determine the occurrence of) the switch control condition in S503—YES. In this manner, the electronic device 100 may identify that the data transmission/reception scheme is, for example, the WiFi scheme associated with the additional antenna 330. As such, the electronic device 100 may maintain the operation of the WiFi antenna, i.e., the additional antenna 330, at step 507—YES.

In response, however, to determining that the data transmission/reception scheme is a diversity communication scheme, and, thereby, not the additional communication scheme in S507—NO, the electronic device 100 may control the diversity antenna 340 to be in an off state in S511. For example, when it is identified that the data transmission/reception scheme is an E-UTRAN scheme, and, thereby, not the aforementioned WiFi scheme of the additional antenna 330, the electronic device 100 may control the diversity antenna 340 to be turned off or otherwise not utilized. Further, the electronic device 100 may control a switch (or connection) that changes operation of data transmission/reception to the additional antenna 330 in S513. In this manner, the electronic device 100 may control performance of the communication of the diversity system using the additional antenna in S515. For example, when it is identified that the data transmission/reception scheme is the E-UTRAN scheme, and, thereby, not the WiFi scheme, the electronic device 100 may perform the data transmission/reception using the WiFi antenna based on the E-UTRAN scheme.

According to exemplary embodiments, when the capability of the diversity antenna 340 deteriorates during a process in which the diversity antenna 340 performs the data transmission/reception based on, for example, the E-UTRAN scheme, the electronic device 100 may switch from the diversity antenna 340 to the additional antenna 330. For example, the electronic device 100 may control the WiFi antenna to perform the data transmission/reception based on the E-UTRAN scheme by connecting the WiFi antenna corresponding to the additional antenna 330 to the diversity system. As such, an electronic device and a control method thereof may stably perform data transmission/reception based on a diversity system communication scheme although the capability of the diversity antenna 340 deteriorates.

Figure 6:
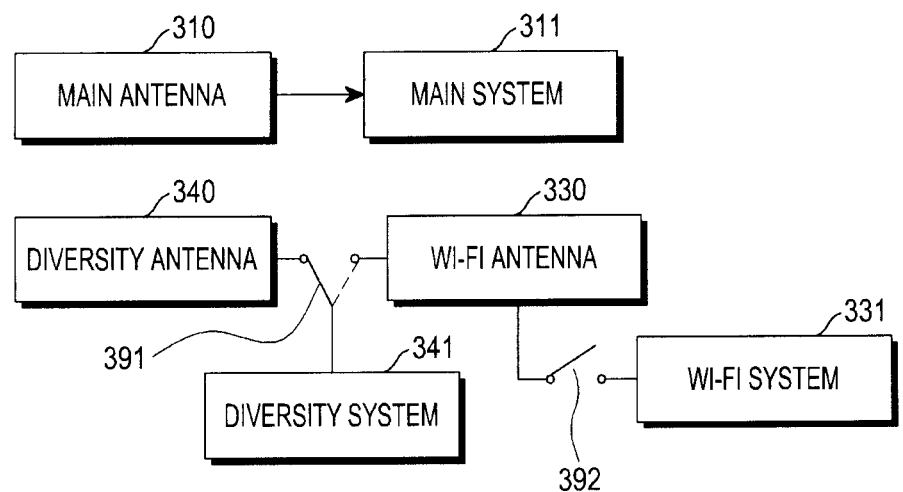
FIG. 6 is a block diagram of an electronic device, according to exemplary embodiments.

FIG. 6 is a block diagram of an electronic device, according to exemplary embodiments.

As illustrated in FIG. 6, the main antenna 310 may be connected to a main communication system 311, and the diversity antenna 340 may be or may not be connected to a diversity communication system 341. Further, based on a connection state of the diversity antenna, the additional antenna 330 may or may not be connected to the diversity communication system 341. In addition, the additional antenna 330 may or may not be connected to an additional communication system 331. Each of the main communication system 311, the additional communication system 331, and the diversity communication system 341 may be a communication module (or other node) of a corresponding communication infrastructure that is configured to perform, for example, data communication based on at least one associated communication scheme.

According to exemplary embodiments, the additional antenna 330 may be connected to the additional communication system 331 or the diversity communication system 341 to perform data transmission/reception based on an additional communication scheme or at least one communication scheme of the diversity communication system 341. The diversity antenna 340 may be connected to the diversity communication system 341 to perform data transmission/reception based on the at least one communication scheme used in the diversity communication system 341. To this end, the main antenna 310 may be connected to the main communication system 311 to perform data transmission/reception based on at least one main communication scheme of the electronic device 100.

For example, during a first period in which it is determined that the capability of the diversity antenna 340 deteriorates, a switch control condition may be determined as being satisfied, and, as such, the additional antenna 30 may be connected to the diversity communication system 341 to perform data transmission/reception based on the communication scheme used in the diversity communication system 341. During a second period, in which it is determined that the capability of the diversity antenna 340 is acceptable, the switch control condition may be determined as not being satisfied; however, the additional antenna 330 may remain connected to the diversity communication system 341 to perform data transmission/reception based on the communication scheme used in the diversity communication system 341. It is also contemplated that the electronic device 100 may be controlled to switch back to utilization of the diversity antenna 340 instead of the additional antenna 330.

As seen in FIG. 6, a first antenna 391 may connect the diversity communication system 341 with the diversity antenna 340 or the additional antenna 330. A second antenna 392 may connect or may not connect the additional communication system 331 and the additional antenna 330. For instance, when the additional antenna 330 is connected to the diversity communication system 341, the second antenna 392 may perform a switching operation, such that the additional communication system 331 is not connected to the additional antenna 330. It is noted that the switching operation may repeatedly occur, so as to enable the additional antenna 330 to allow for communications via the diversity communication system 341 and the additional communication system 331.

Figure 7A:
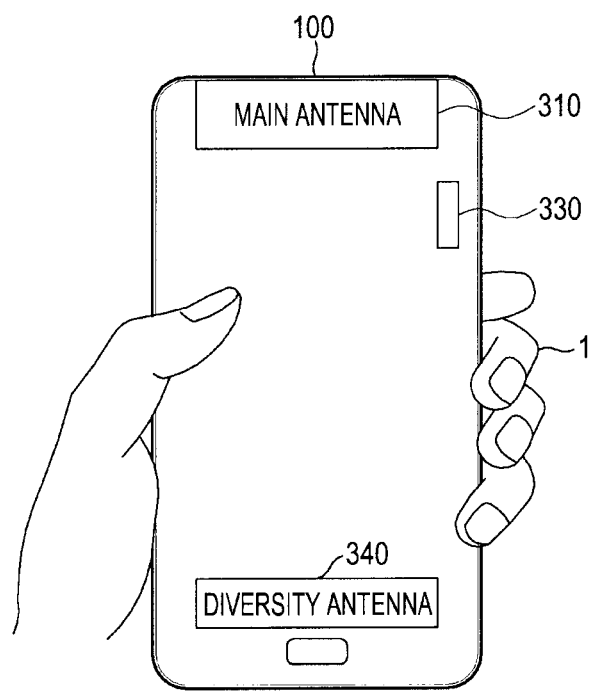
FIG. 7A, FIG. 7B, and FIG. 7C provide respective situations when diversity antenna capability may be deteriorated, according to exemplary embodiments.
Figure 7B:
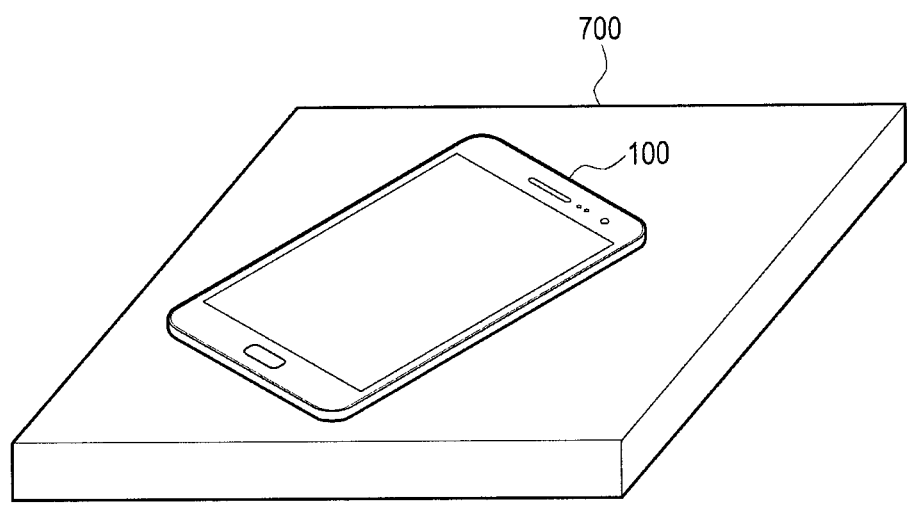
Figure 7C:
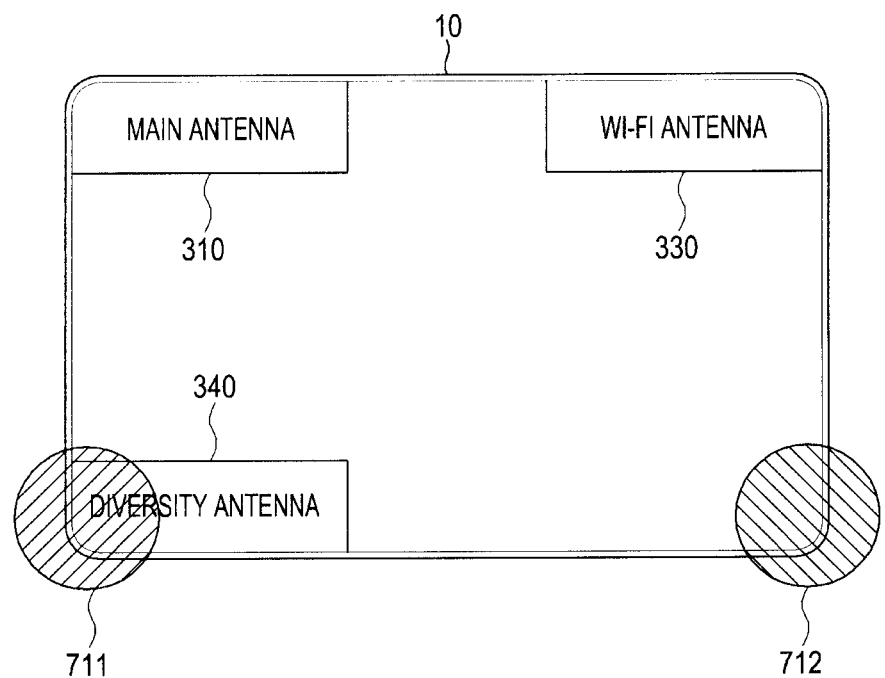

FIGS. 7A-7C provide respective situations when diversity antenna capability may be deteriorated, according to exemplary embodiments.

As illustrated in FIG. 7A, the electronic device 100 may include the main antenna 310 and the diversity antenna 340. The main antenna 310 may be disposed in association with a relatively upper part of the electronic device, whereas the diversity antenna 340 may be disposed in association with a relatively lower part of the electronic device 100, or vice versa. The respective positions of the main antenna 310 and the diversity antenna 340 may be utilized to prevent communication coupling between the main antenna 310 and the diversity antenna 340. In this manner, any suitable positioning scheme may be utilized in association with the main antenna 310 and the diversity antenna 340 that enables the main antenna 310 to be spaced apart from the diversity antenna 340 by at least a distance to prevent the aforementioned communication coupling. As such, when the main antenna 310 is disposed on a relatively upper part of the electronic device 100, the diversity antenna 340 may be disposed on a relatively lower part of the electronic device 100 to maintain the above-noted distance.

Further, the additional antenna 330 may be vertically disposed on an upper, side part (e.g., upper right part) of the electronic device 100. It is contemplated, however, that the additional antenna 330 may be disposed in any other suitable location. It is noted that since the additional antenna 330 may operate according to one or more different frequencies than the main antenna 310, communication coupling may be less likely between the main antenna 310 and the additional antenna 330.

As depicted in FIG. 7A, a user 1 may surround (e.g., grip) the electronic device 100 using their hand. When the user 1 surrounds the electronic device 100 using their hand, a position where the diversity antenna 340 is located may be touched, and, thereby, affect the operating conditions of the diversity antenna 340. For instance, when the user 1 touches the diversity antenna 340, at least some shifting in the frequency response, degradation of efficiency, signal blocking, etc., of the diversity antenna 340 may occur, and, as such, the capability of the diversity antenna 340 may deteriorate below at least one threshold metric.

According to exemplary embodiments, the electronic device 100 may determine whether a body of the user 1 touches the electronic device 100 (e.g., the diversity antenna 340) based on one or more signals of the sensor module 170. When it is determined that the body of the user 1 touches, for example, the diversity antenna 340 or another part of the electronic device 100 affecting performance of the diversity antenna 340, the electronic device 100 may disconnect the diversity antenna 340 from a diversity communication system and connect the additional antenna 330 to the diversity communication system. In this manner, the electronic device 100 may perform data transmission/reception using the additional antenna 330 based on a communication scheme used in association with the diversity communication system.

As illustrated in FIG. 7B, the electronic device 100 may be disposed on, for example, a metal surface 700. It is noted, however, that other types of materials that provide, for example, ground conduction or dielectric functions, may absorb radio frequency energy or otherwise affect performance of the diversity antenna 340. In this manner, the electronic device 100 may detect (or otherwise determine) a reduction in intensity of a received or transmitted signal.

When it is determined that the intensity of the received signal is reduced below at least one threshold metric, the electronic device 100 may disconnect the diversity antenna 340 and connect the diversity system to the additional antenna 330. Further, the electronic device 100 may perform data transmission/reception using the additional antenna 330 based on a communication scheme of the diversity system.

Adverting to FIG. 7C, the electronic device 100 may, for example, correspond to a tablet PC. In this manner, the main antenna 310 may be disposed in association with an upper left part of the electronic device 100, the additional antenna 330 may be disposed in association with an upper right part of the electronic device 100, and the diversity antenna 340 may be disposed in association with a lower left part of the electronic device 100. As such, when the user 1 holds the electronic device 100, the user may touch the lower left part 711 and a lower right part 712. As mentioned, this may affect the capability of the diversity antenna 340, and, as such, performance of the electronic device 100 (e.g., diversity antenna 340) may deteriorate.

Figure 8A:
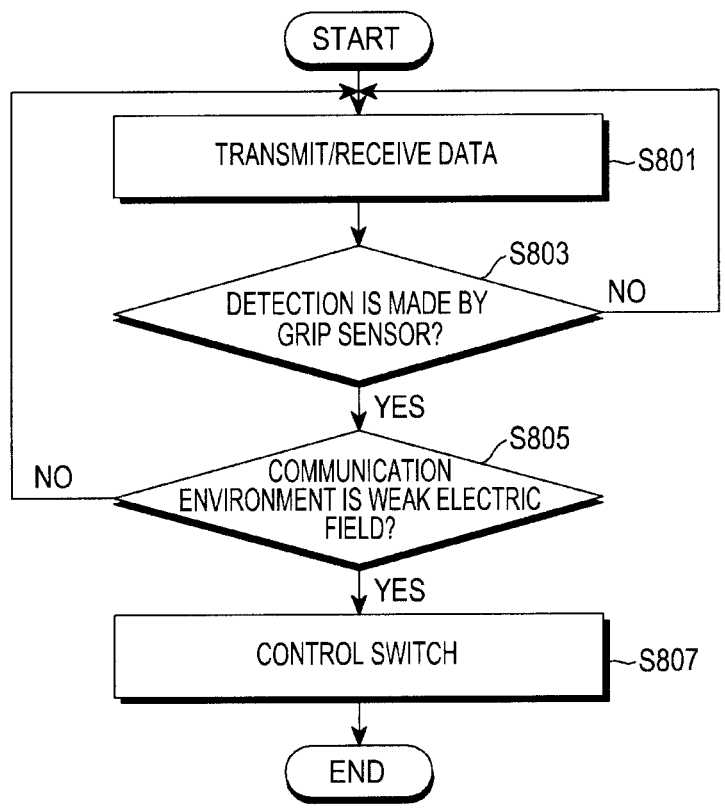
FIG. 8A and FIG. 8B are respective flowcharts of processes to control an electronic device, according to exemplary embodiments.
Figure 8B:
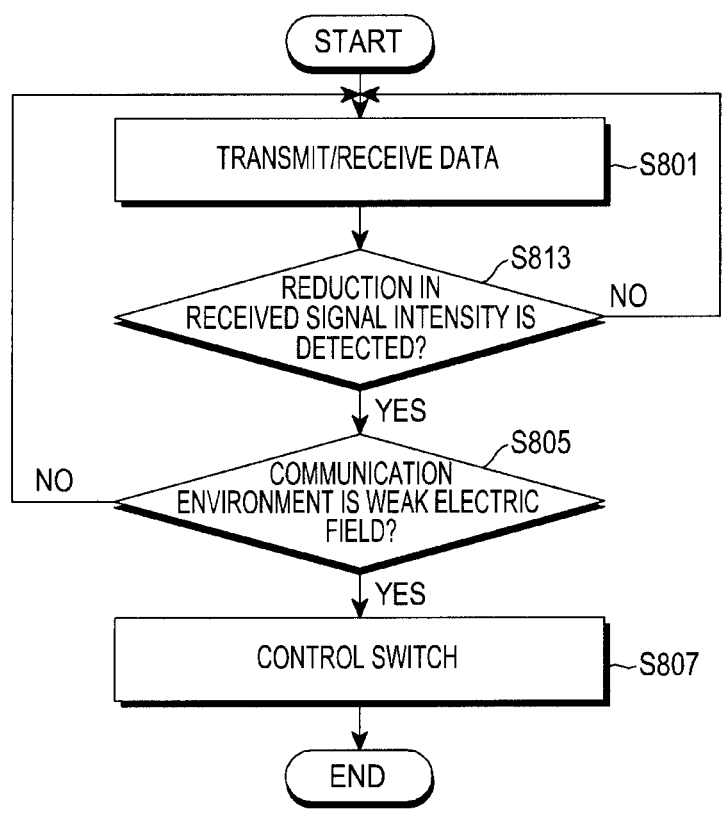

FIGS. 8A and 8B are respective flowcharts of processes to control an electronic device, according to exemplary embodiments. These exemplary processes are provided by way of example, as there are a variety of ways to carry out methods described herein. The methods of FIGS. 8A and 8B may be executed or otherwise performed by one or a combination of various systems, modules, and/or devices. The methods are described below as carried out by the electronic device 100 of FIGS. 1-4, and various elements thereof are referenced in explaining the processes of FIGS. 8A and 8B. In this manner, each block shown in FIGS. 8A and 8B may represent one or more processes, methods, or subroutines executed in association with carrying out the processes. In hits manner, one or more of the processes, methods, or subroutines may be combined, separated, and/or rearranged without departing from exemplary embodiments described herein.

As seen in FIG. 8A, the electronic device 100 may transmit/receive data (in S801) via the diversity antenna 340 connected to a diversity system. At some point, a grip sensor (or any other one or sensors of sensor module 170) may detect (in S803) whether the electronic device 100 is touched in a position that may affect the performance of the diversity antenna 340. In response to determining that the electronic device 100 is touched in such a manner (S803—YES), the electronic device 100 may determine (in S805) whether a communication environment is associated with a weak electric field. In response to determining that, for example, the intensity of the received/transmitted signal is smaller than at least one threshold metric, the electronic device 100 may determine that the communication environment is associated with a weak electric field (S805—YES). As such, the electronic device 100 may control a switching operation to connect the diversity system with the additional antenna 330 instead of connecting with the diversity antenna 340 (S807). In this manner, the additional antenna 330 may be utilized to transmit/receive data according to at least one communication protocol of the diversity system. If, however, the grip sensor does not detect the above-noted touch (S803—NO) or the communication environment is not associated with a weak electric field (S805—NO), the electronic device 100 may continue to at least utilize the diversity antenna 340 connected to the diversity system.

Adverting to FIG. 8B, the electronic device 100 may transmit/receive data via diversity antenna 340 in S801. At some point, the electronic device 100 may detect (or otherwise determine) whether the intensity of the received signal is reduced in S813. For example, the electronic device may determine whether the intensity of the received and/or transmitted signal is smaller than at least one first threshold metric. The reduction in the signal intensity may occur in association with one or more of the aforementioned examples described in association with FIGS. 7A-7C. In response to determining that signal intensity is lower than at least one first threshold metric (S803—YES), the electronic device 100 may determine whether the communication environment is associated with a weak electric field in S805. When the intensity of the received signal is smaller than at least one second threshold metric, the electronic device 100 may determine that the communication environment is associated with a weak electric field (S805—YES). As such, the electronic device 100 may control a switching operation that connects the diversity system with the additional antenna 330 instead of the diversity antenna 340. In this manner, the additional antenna 330 may be utilized to transmit/receive data according to at least one communication protocol of the diversity system. If the signal intensity is not reduced beyond the at least one first threshold metric (S813—NO) or the communication environment is not associated with a weak electric field (S805—NO), the electronic device 100 may continue to at least utilize the diversity antenna 340 connected to the diversity system.

According to exemplary embodiments, one or more of the features, functions, processes, etc., described herein may be implemented via hardware (e.g., general processor, digital signal processing (DSP) chip, an application specific integrated circuit (ASIC), field programmable gate arrays (FPGAs), etc.), software, firmware, or a combination thereof. In this manner, any such software may be stored, for example, in one or more memories including code (e.g., instructions) configured to cause one or more components of the electronic device 100 to perform one or more of the features, functions, processes described herein.

The memories may be any medium that participates in providing code/instructions to the one or more software, hardware, and/or firmware components for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Further, in exemplary embodiments, the electronic device 100 may be configured to receive software from a program providing apparatus connected to the electronic device 100 via a wired or wireless connection. In this manner, the electronic device 100 may be configured to store the received program. The program supply apparatus may include a program that includes instructions to execute one or more of the features, functions, processes, etc., described herein, a memory that stores information, and/or the like, a communication unit that conducts wired or wireless communication with the electronic device 100, and/or a control unit to transmit a corresponding program to a transmission/reception apparatus in response to the request from the electronic device 100 or automatically.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus, comprising:
a main antenna;
a diversity antenna configured to provide data communication according to a first communication scheme;
an additional antenna configured to provide data communication according to one of the first communication scheme and a second communication scheme different from the first communication scheme; and
at least one processor configured to:
detect a condition affecting performance of the diversity antenna,
identify utilization of a data communication scheme, and
if the data communication scheme is identified as the second communication scheme, maintain utilization of the additional antenna, and
if the data communication scheme is identified as the first communication scheme, switch from utilization of the diversity antenna to utilization of the additional antenna,
wherein one of the diversity antenna and the additional antenna is activated along with the main antenna.

2. The apparatus of claim 1, wherein the switch is configured to:
disconnect the diversity antenna from a diversity communication system; and
connect the additional antenna to the diversity communication system.

3. The apparatus of claim 2, wherein the connection to the diversity communication system is according to the first communication scheme.

4. The apparatus of claim 1, wherein the first communication scheme comprises one of wideband code division multiple access (WCDMA), global system for mobile communications (GSM), high speed packet access (HSPA), evolved universal terrestrial radio access (E-UTRA), and evolved universal terrestrial radio access network (E-UTRAN).

5. The apparatus of claim 1, wherein the second communication scheme comprises one of WiFi (IEEE 802.11), Bluetooth, Bluetooth low energy (BLE), and ZigBee (IEEE 802.15.4).

6. The apparatus of claim 1, wherein:
the condition corresponds to a touch between the apparatus and a body part; and
the at least one processor is configured to detect the touch in association with at least one of an optical sensor, a capacitive touch sensor, a grip sensor, a capacitive grip sensor, and a pressure sensor.

7. The apparatus of claim 1, wherein the condition corresponds to a radio signal intensity being smaller than a threshold value.

8. The apparatus of claim 1, wherein:
the at least one processor is further configured to determine, in response to detection of the condition, whether data communication via the diversity antenna is associated with a weak electric field; and
the at least one processor is configured to perform the switch in response to determination of the weak electric field.

9. A method, comprising:
providing data communication using a diversity antenna with a main antenna, the diversity antenna providing data communication according to a first communication scheme;
providing data communication according to one of the first communication scheme and a second communication scheme by an additional antenna;
detecting a condition affecting performance of the diversity antenna;
identifying utilization of a data communication scheme;
if the data communication scheme is identified as the second communication scheme, maintaining utilization of an additional antenna; and
if the data communication scheme is identified as the first communication scheme, switching from utilization of the diversity antenna to utilization of the additional antenna,
wherein one of the diversity antenna and the additional antenna is activated along with the main antenna.

10. The method of claim 9, wherein:
the diversity antenna is configured to perform data communication based on a first radio protocol; and
the additional antenna is configured to perform data communication based on one of the first radio protocol and a second radio protocol different from the first radio protocol.

11. The method of claim 10, wherein performance of the data communication is continued using the first radio protocol.

12. The method of claim 10, wherein the data communication is performed based on a connection with a diversity communication system.

13. The method of claim 9, wherein the first communication scheme comprises one of wideband code division multiple access (WCDMA), global system for mobile communications (GSM), high speed packet access (HSPA), evolved universal terrestrial radio access (E-UTRA), and evolved universal terrestrial radio access network (E-UTRAN).

14. The method of claim 9, wherein the second communication scheme comprises one of WiFi (IEEE 802.11), Bluetooth, Bluetooth low energy (BLE), and ZigBee (IEEE 802.15.4).

15. The method of claim 9, wherein the condition corresponds to a touch condition.

16. The method of claim 9, wherein the condition corresponds to a radio signal intensity being smaller than a threshold value.

17. The method of claim 9, wherein detecting the condition comprises:
determining that the data communication using the diversity antenna is associated with a weak electric field.

* * * * *